United States Patent

[11] 3,601,289

[72] Inventor August W. Gustafson
Corpus Christi, Tex.
[21] Appl. No. 848,044
[22] Filed Aug. 6, 1969
[45] Patented Aug. 24, 1971
[73] Assignee Gustafson Manufacturing Company, Inc.
Corpus Christi, Tex.

[54] APPARATUS FOR DISTRIBUTING CHEMICALS
3 Claims, 9 Drawing Figs.
[52] U.S. Cl. .................................................. 222/238,
222/177
[51] Int. Cl. ...................................................... G01f 11/20
[50] Field of Search .......................................... 222/238,
239, 241, 281, 352, 406, 407, 412, 486

[56] References Cited
UNITED STATES PATENTS
1,213,737 1/1917 Brumley .................... 222/486 X 1,220,958 3/1917 Cornwall ..................... 222/238
1,758,065 5/1930 Sherling et al. ............. 222/406 X
2,983,490 5/1961 Denman ..................... 222/238 X
3,149,760 9/1964 Eichorn et al. .............. 222/406 X Primary Examiner—Samuel F. Coleman
Assistant Examiner—Thomas E. Kocovsky
Attorney—Clelle W. Upchurch ABSTRACT: Apparatus for distributing minute quantities of pulverulent chemical materials in a uniform manner to the soil to inhibit growth of certain types of vegetation and for distribution of chemicals for destroying organisms which attack agricultural crops. The chemical material moves from a hopper into a feed barrel and is discharged therefrom only when a helical member shifts the pulverulent material lengthwise of the barrel. A rod in the helical member has a flat face and serves to control the rate at which the chemical material is discharged.

PATENTED AUG 24 1971

INVENTOR
AUGUST W. GUSTAFSON

BY [signature]
ATTORNEY

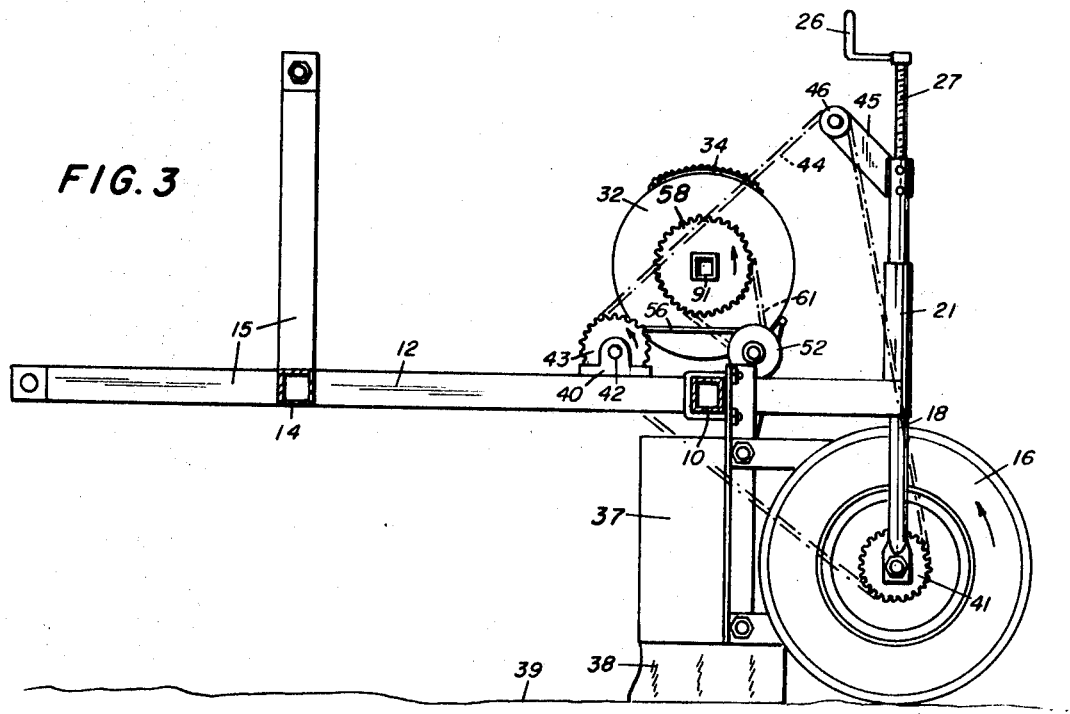

PATENTED AUG 24 1971

INVENTOR
AUGUST W. GUSTAFSON

BY
ATTORNEY

APPARATUS FOR DISTRIBUTING CHEMICALS

The present invention relates to apparatus for distributing pulverulent chemical materials which serve as herbicides or insecticides and the invention more specifically pertains to equipment which is adapted to be moved over land to be treated and to uniformly distribute pulverulent chemical materials in carefully controlled quantities.

Chemical materials in pulverulent form are employed for treating the soil in agricultural pursuits. Such chemicals are expensive and the appreciated applied to the soil are quite small and it is an object of the invention to provide equipment for of the hopper. The feed barrel is provided with a plurality of distribution of such chemical materials wherein the discharge of the pulverulent material is readily controlled to avoid over-or-under application of the chemicals and to provide apparatus wherein the pulverulent chemical material is distributed over the area to be treated.

Another object of the invention is to provide outlet openings in the feed barrel of such shape in relation to direction of rotation of the auger therein that the pulverulent chemical material is continuously and uniformly discharged from the hopper to provide for even distribution of small volumes of the pulverulent material.

Another object of the invention is to provide means within the hopper to prevent the bridging or arching of the finely divided pulverulent material in the vicinity of the discharge openings in the hopper and to effectively move the pulverulent material from the hopper into the distributing mechanism.

Other objects and features of the invention will be appreciated and become apparent as the present disclosure proceeds and upon consideration of the following detailed description taken in conjunction with the accompanying drawings wherein an exemplary embodiment of the invention is disclosed.

In the drawings:

FIG. 3 is a sectional elevational view taken on the line 3—3 of FIG. 2.

FIG. 4 is an exploded perspective view of one of the hoppers and the associated distributing mechanism.

Figure 1:
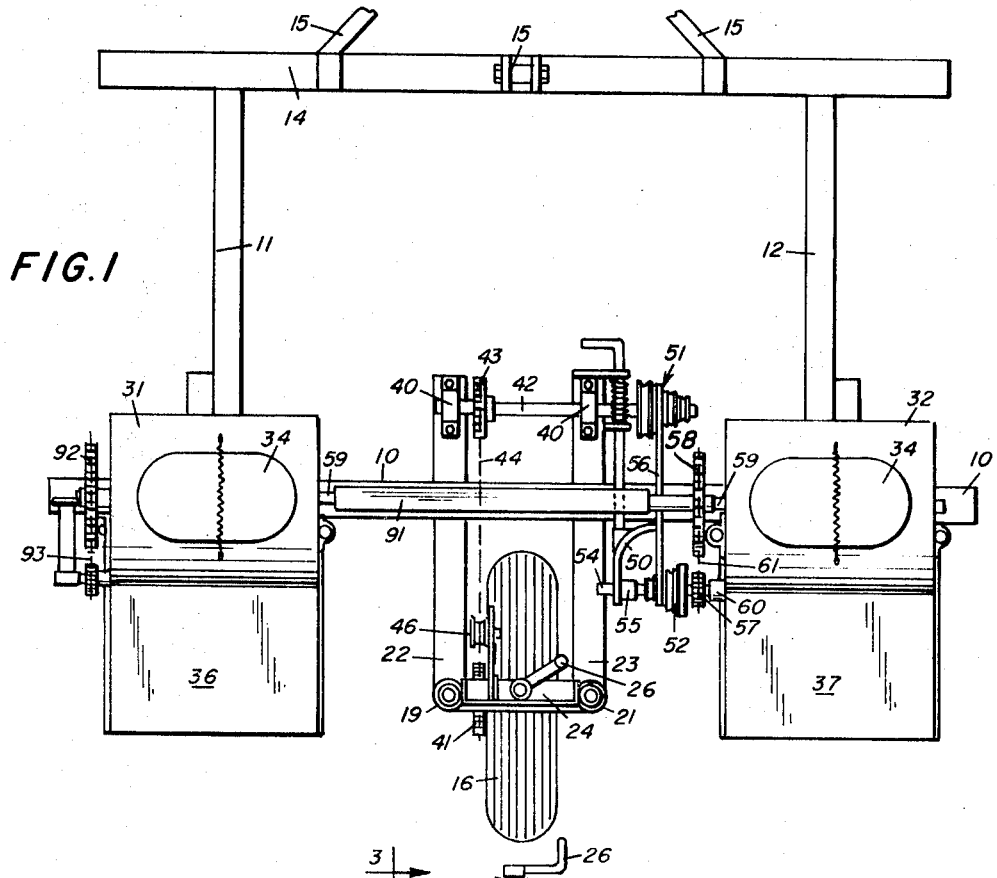
FIG. 1 is a plan view of apparatus embodying the invention.

A frame is provided for supporting the hoppers and the distributing mechanisms. The frame includes a transverse member 10 and side rails 11 and 12 which are connected at their forward portions with another transverse member 14. The frame is equipped at its forward end with conventional elements 15 for connection to a three-point hitch of a tractor. The transverse member 10 serves to support the hoppers and distributing mechanism and this portion of the frame is adapted to be supported for rolling movement by a wheel 16. Two legs 17 and 18 extend upwardly from a journal for the wheel 16 and these legs are guided in tubular members 19 and 21 attached to a transverse member 10 by horizontal arms 22 and 23. A tie member 24 connects the upper end portions of the legs 17 and 18. A crank 26 and a stem 27 is threaded through a threaded member 25 mounted on the tie member 24. The lower end of the stem 27 is secured in a fixed rotatable relationship to the horizontal member which joins the tubular members 19 and 21. The wheel 16 may thus be vertically moved relative to the frame to adjust the position of the frame above the soil. The wheel 16 also serves to drive the rotatable elements of the distributing mechanisms and this feature is described hereinbelow.

Figure 2:
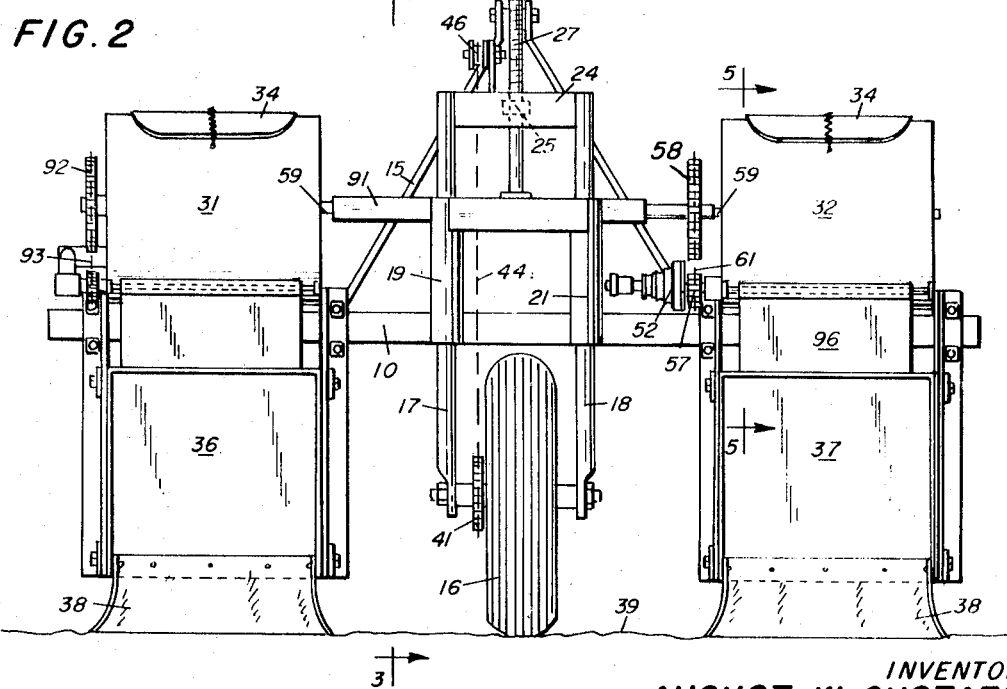
FIG. 2 is an elevational view taken from the rear of the apparatus.

Apparatus embodying the invention includes a hopper in which the pulverulent chemical material is stored, and in one embodiment two of such hoppers 31 and 32 are mounted on the frame. The hoppers 31 and 32 are of a cylindrical formation and may be supported in any suitable manner on the frame with the axes of both hoppers in general horizontal alignment. Each hopper has an opening 30 in the upper portion through which the pulverulent material is introduced. This opening is obstructed by a closure member 34. A generally rectangularly shaped shield structure 36 is provided under the hopper 31 and a similarly shaped shield 37 is mounted under the hopper 32. These shield structures may be supported in any suitable manner on the frame. A flexible skirt 38 is provided at the lower end of each shield structure. The flexible skirts 38 may engage the soil 39 (FIG. 2) to thereby prevent drifting of the costly chemical materials as they move downwardly onto the soil.

A sprocket wheel 41 is carried by the shaft about which the wheel 16 rotates so that it is driven as the wheel 16 rolls on the surface of the ground. A shaft 42 is journaled for rotation in bearings 40 carried by the frame as shown in FIG. 1. A sprocket wheel 43 is keyed to the shaft 42. A sprocket chain 44 trained about the sprocket wheels 41 and 43 and an idler sprocket 46 serves to drive the shaft 42 in a counterclockwise direction as viewed in FIG. 3 during the forward movement of the apparatus. The idler sprocket 46 is supported for rotation by a bracket 45 mounted on the leg 17 so that the idler moves with vertical movements of the wheel 16. The rotation of the wheel 16 during forward movement of the apparatus thus serves as a source of power for driving other elements of the distributing apparatus.

A stepped pulley 51 having annular grooves of different diameters for receiving a belt is secured to the shaft 42. A similar pulley 52 is mounted on the shaft 54. This shaft is journaled in a bearing 55 supported by a bracket 50. The other end of the shaft 54 rotates in a bearing 60 which is supported by the feed barrel. A belt 56 trained about the pulleys 51 and 52 transmits rotation of the shaft 42 to the shaft 54. A sprocket wheel 57 is mounted on the shaft 54. A sprocket wheel 58 is secured to a shaft 59 which extends lengthwise within the hopper 32. A sprocket chain 61 is trained about the sprocket wheels 57 and 58. Thus power is transmitted to the shaft 59. The axis of the hopper is indicated at 65 in FIGS. 4 and 5. The shaft 59 is displaced from the axis 65 and the purpose of such displacement will be more fully understood as the disclosure proceeds.

Figure 5:
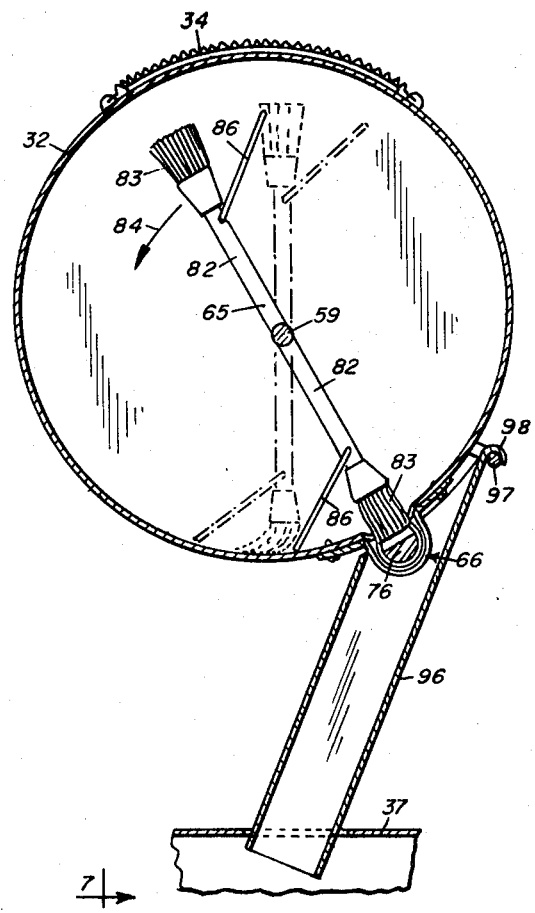
FIG. 5 is a sectional view taken on the line 5—5 of FIG. 2.
Figure 6:
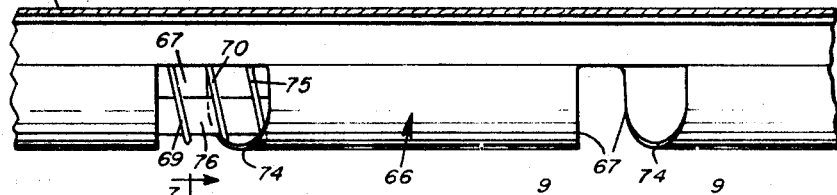
FIG. 6 is a fragmentary view partly in elevation of a portion of the distributing mechanism.
Figure 9:
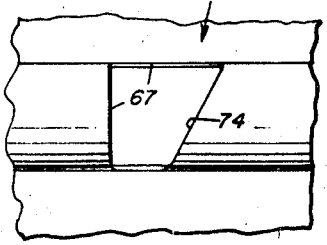
FIG. 9 is an inverted plan view of a portion of the distributor trough.

A feed barrel 66 is mounted on each hopper and the association thereof with the hopper 32 will be appreciated from consideration of FIGS. 4 and 5. The feed barrel may be bolted or otherwise attached to the periphery of the hopper. The feed barrel is provided with a plurality of outlet openings 67 spaced from each other along the length of the barrel. Each opening 67 has a particular shape as best shown in FIGS. 6 and 9. It will be observed that the openings 67 are of greater dimension measured lengthwise of the feed barrel 66 along the rear portion thereof. A helical member 69 is mounted within the feed barrel 66 and extends throughout the length of the hopper 32. The helical member or coil has space between the turns thereof. A plurality of openings 71 are provided in the hopper 32 and these apertures are displaced longitudinally of the feed barrel from the discharge openings 67. Thus the pulverulent material escaping from the hopper 32 through the apertures 71 will not be discharged from the openings 67 until the helical member 69 is rotated in the direction of the arrow 73. The pulverulent chemical material escaping through the apertures 71 moves into the feed barrel 66 and as the helical member 69 rotates, the chemical material is moved to the left in FIG. 6 and when one of the coils of the helical member 69 has shifted the pulverulent material forwardly it will begin to discharge material through the widened portion of the opening 67. As the coil 70 completes the discharge of the pulverulent material through the opening 67, the coil 75 moves material in advance thereof beyond the widened edge 74 of the opening 67. The result is that there is a continuous and constant and uniform discharge of the pulverulent material through the openings 67. The helical member 69 is rotated in the direction of the arrow 73 and is driven by the shaft 54. The inboard end of the helical member includes a radial portion which extends into a slot 78 of a shaft portion which extends into the feed barrel 66. The chemical materials are corrosive and tend to harden in the presence of moisture. The helical member 69 may be withdrawn from the feed barrel and through the outboard end thereof and such disconnection of the helical member with its driving shaft is permitted by the slot 78.

Figure 7:
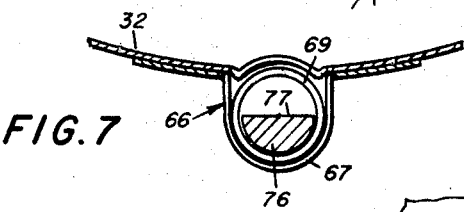
FIG. 7 is a fragmentary sectional view taken on the line 7—7 of FIG. 6.
Figure 8:
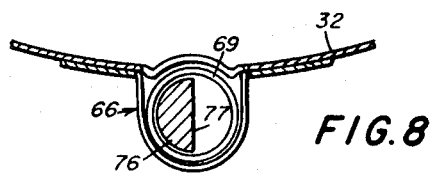
FIG. 8 is a similar sectional view.

A control rod 76 is mounted within the helical member 69. This control rod has a flat surface 77 and may be of hemicylindrical shape as shown in FIG. 7. The control rod is adapted to be rotated about the axis of the feed barrel and secured in the desired rotated position in any suitable manner. When the control rod is in the rotated position shown in FIG. 7, there is a minimum output of the pulverulent material. When the control rod 76 is rotated to the position shown in FIG. 8, there is a maximum movement of the pulverulent chemical material from the hopper through the feed barrel and out the discharge openings 67. Rotation of the control rod 76 from the position shown in FIG. 7 by approximately 15° in the direction of rotation of the helical member 69 will provide for an increase of approximately 1 pound of the pulverulent material for each acre of soil being treated.

A brush assembly is provided within each hopper and each includes as a part thereof the shaft 59 and a plurality of radially disposed arms 82 each having a brush 83 at the outer end thereof. The arms 82 are of equal length but the shaft 59 being displaced from the axis 65 of the hopper 32 causes the brushes 83 to extend outwardly through the apertures 71 and dislodges any pulverulent material that may be lodged therein. The brushes 83 engage the coils of the helical member 69 and brush away any particles that may tend to remain between the coils. The brushes in rotating in the direction of the arrow 84 in FIG. 4 also serve to move the chemical material towards the apertures 71. Scraper elements 86 attached to the arms 82 of the brush assembly serve to urge the chemical material towards the apertures 71.

A telescoping noncircular type of shaft assembly 91 serves to drive the shaft 59 associated with the feed mechanism for the hopper 31. The sprocket wheel 92 carried by the shaft 59 at the outboard side of the hopper 31 serves, through a sprocket chain 93 to drive the helical member associated with the feed barrel for moving the pulverulent material from the hopper 31. Each hopper under the feed barrel is provided with an elongated discharge chute 96 which may be detachably secured to the associated hopper in any suitable manner such as by means of rods 97 and hooks 98. The discharge chute 96, as shown in FIG. 5, depends into the associated shield structure.

In operation, the pulverulent material is moved from the drums 31 and 32 towards the apertures 71 in their respective drums by the associated brush assemblies and the agitating elements 86. The material in each feed barrel is moved in the feed barrel by the associated helical member 69 to a position where it escapes downwardly through the discharge openings 67. The delivery of the chemical material is interrupted when the frame is lifted by the three-point hitch to raise the wheel 16 so that it no longer engages the soil. Rotation of the helical members 69 is thus interrupted so that the pulverulent material that may tend to move downwardly through the aperture 71 is retained in the feed barrel 66. Thus when the tractor and the equipment makes a turn at the end of the treating operation, the expensive and costly chemical materials are not released from the hoppers.

While the invention has been described with regard to one type of equipment and with respect to specific structural components, it will be appreciated that changes may be made in the overall assembly as well as the elements. Such changes may be made without departing from the invention.

What is claimed and desired to be secured by Letters Patent is:

1. Apparatus for distributing pulverulent materials comprising, a hopper having a plurality of spaced apertures in a lower portion thereof, a feed barrel receiving the pulverulent material escaping through said apertures, said feed barrel having discharge openings therein laterally spaced from said apertures, a helical member within said feed barrel, means for rotating said helical member to move the pulverulent material lengthwise within the feed barrel to positions over said discharge openings, a control rod within said helical member, said control rod having a flat surface thereon throughout the length of the feed barrel, and said control rod being rotatable independently of the helical member about the axis thereof to alter the position of the flat surface in relation to a horizontal plane.

2. Apparatus for distributing pulverulent materials according to claim 1 wherein the control rod is hemicylindrical shaped in cross section.

3. Apparatus for distributing pulverulent materials comprising, a hopper having plurality of spaced apertures in a lower portion thereof, a feed barrel receiving the pulverulent material escaping through said apertures, said feed barrel having discharge openings therein laterally spaced from said apertures, a helical member within said feed barrel, means for rotating said helical member to move the pulverulent material lengthwise within the feed barrel to positions over said discharge openings, brushes mounted for rotation within the hopper about an axis displaced from the center line of the hopper whereby free ends of the brushes enter the apertures and engage the helical member.